United States Patent [19]

Hasebe

[11] Patent Number: 4,891,779
[45] Date of Patent: Jan. 2, 1990

[54] APPARATUS FOR ARITHMETIC PROCESSING

[75] Inventor: Atsushi Hasebe, Kanagawa, Japan

[73] Assignee: Sony Corporation, Tokyo, Japan

[21] Appl. No.: 43,749

[22] Filed: Apr. 30, 1987

[30] Foreign Application Priority Data

Apr. 30, 1986 [JP] Japan ............................... 61-100036

[51] Int. Cl.⁴ ............................................... G06F 7/52
[52] U.S. Cl. .................................................... 364/754
[58] Field of Search ............... 364/754, 757, 736, 715, 364/748, 728

[56] References Cited

U.S. PATENT DOCUMENTS

| | | | |
|---|---|---|---|
| 4,467,444 | 8/1984 | Harmon, Jr. et al. | 364/736 |
| 4,682,302 | 7/1987 | Williams | 364/754 |
| 4,720,871 | 1/1988 | Chambers | 364/728 |
| 4,722,068 | 1/1988 | Kuroda et al. | 364/757 |

*Primary Examiner*—David L. Clark
*Assistant Examiner*—Long T. Nguyen
*Attorney, Agent, or Firm*—Lewis H. Eslinger; Jay H. Maioli; Donald S. Dowden

[57] ABSTRACT

In a high-speed arithmetic processor, a first number that has an absolute value that can exceed one is multiplied by a second number that has an absolute value not exceeding one. If the first number exceeds one it is divided into an integer and a part having a value less than one. The second number is accumulated as an addend a number of times equal to the integer to produce a sum. The second number and the part of the first number having a value less than one are supplied to a multiplier to produce a partial product. An adder adds the partial product to the sum, thereby obtaining a final product of the first and second numbers. The multiplication is thereby performed in a number of steps which is minimized and never varies, regardless of whether the absolute value of the first number is, for example, less than one, at least one but less than two, or at least two but less than three. This speeds up the arithmetic processing and simplifies the programming therefor.

11 Claims, 8 Drawing Sheets

APPARATUS FOR ARITHMETIC PROCESSING

BACKGROUND OF THE INVENTION

1. Field of the Invention

This invention relates to arithmetic processors and, in particular, to a novel and highly effective arithmetic processor adapted for use in video image processors and in other high-speed data processors and able to process data more rapidly than arithmetic processors heretofore conventional in such apparatus.

2. Description of the Prior Art

Video image processing apparatus must process data at high speed. In commercial television, for example, 25 or 30 frames (depending on the system) are displayed per second, each frame including hundreds of lines and each line including hundreds of pixels (picture elements). In advanced image processing apparatus, signals produced by a television camera are typically converted to digital form, stored in an input image memory, processed in a position stationary processor, stored in an output image memory, converted back to analog form, and then recorded by a VTR and/or displayed on a television monitor. Apparatus such as a position variant processor, a control processor and a host computer are provided for controlling data flows, controlling the execution and stopping of processes, and controlling the entire video image processing apparatus.

In such apparatus, the position stationary processor includes a number of arithmetic units that process signals consisting of data signals and a coefficient. Each data signal is multiplied by its coefficient to produce an output. Depending on the magnitude of the signals, the multiplication requires in conventional practice a different number of steps, for example three to five. It is difficult to write a program that infallibly takes the difference in the number of processing steps (and hence in processing time) into account. Typically, therefore, the program allows for the maximum number of steps that may be required, for example five steps. This means that time is wasted in any case where only three or four steps are required for the multiplication. While the time wasted is short in any given instance, the wasted time is accumulated over and over and is quite significant in the aggregate.

OBJECTS AND SUMMARY OF THE INVENTION

An object of the invention is to remedy the problems of the prior art outlined above.

Another object of the invention is to provide a high-speed arithmetic processor that can multiply two numbers in the same (minimum) number of steps regardless, within limits, of the magnitude of the numbers.

More particularly, an object of the invention is to provide an arithmetic processor for multiplying a first number such as a coefficient that has an absolute value that can exceed one by a second number such as a data number that has an absolute value not exceeding one, the multiplication requiring a number of steps that is minimized and always the same, regardless of whether the absolute value of the first number is, for example, less than one, at least one but less than two, or at least two but less than three.

The foregoing and other objects are attained in accordance with a first aspect of the invention by providing an arithmetic processor for multiplying a first number that has an absolute value that can exceed one by a second number that has an absolute value not exceeding one; the processor comprising; a multiplier; control means responsive to an absolute value of the first number exceeding one for dividing the first number into an integer and a part having a value less than one; accumulating means for accumulating the second number as an addend a number of times equal to the integer to produce a sum; storage means for supplying the second number and the part to the multiplier to produce a partial product thereof; and adder means for adding the partial product to the sum, thereby obtaining a final product of the first and second numbers.

In accordance with a second aspect of the invention, an arithmetic processor comprises a multiplier capable of multiplying two numeric values each having an absolute value not exceeding one; means operative in response to one of the two numeric values exceeding one for dividing the one value into an integer and a part having a value less than one; means for supplying the other of the two numeric values and the part to the multiplier to form a partial product; and means for taking the other numeric value as an added a number of times equal to the integer to form a sum and adding the sum to the partial product, thereby obtaining a final product of the two numeric values.

In accordance with another aspect of the invention, an arithmetic processor comprises an input register; an arithmetic section; a work memory having a write input; and a selector connected between the input register and the write input for selectively supplying data from the input register to the write input.

In accordance with another aspect of the invention, an arithmetic processor is provided comprising an input register; an arithmetic section; a work memory having a write input and an output; and a selector connected between the input register and the write input and between the output and the write input; data from the input register and the output being selectively supplied to the write input via the selector.

In accordance with another aspect of the invention, an arithmetic processor is provided comprising a multiplier having two input terminals; a coefficient memory producing an output; and means connected to the multiplier and the coefficient memory for supplying the coefficient output to both of the input terminals for calculating the square thereof.

In accordance with another aspect of the invention, an arithmetic processor is provided comprising a multiplier having two input terminals; an arithmetic logic unit producing a logic output; and two selectors respectively connected to the two input terminals and responsive to the logic output; whereby the logic output is supplied to both of the input terminals for calculating the square thereof.

BRIEF DESCRIPTION OF THE DRAWINGS

A better understanding of the objects, features and advantages of the invention may be gained from a consideration of the following detailed description of the preferred embodiments thereof, in conjunction with the appended drawings, throughout which a given reference character always indicates the same element or part, and wherein.

DESCRIPTION OF THE PREFERRED EMBODIMENTS

Typical Apparatus Employing Arithmetic Processor

Figure 1:
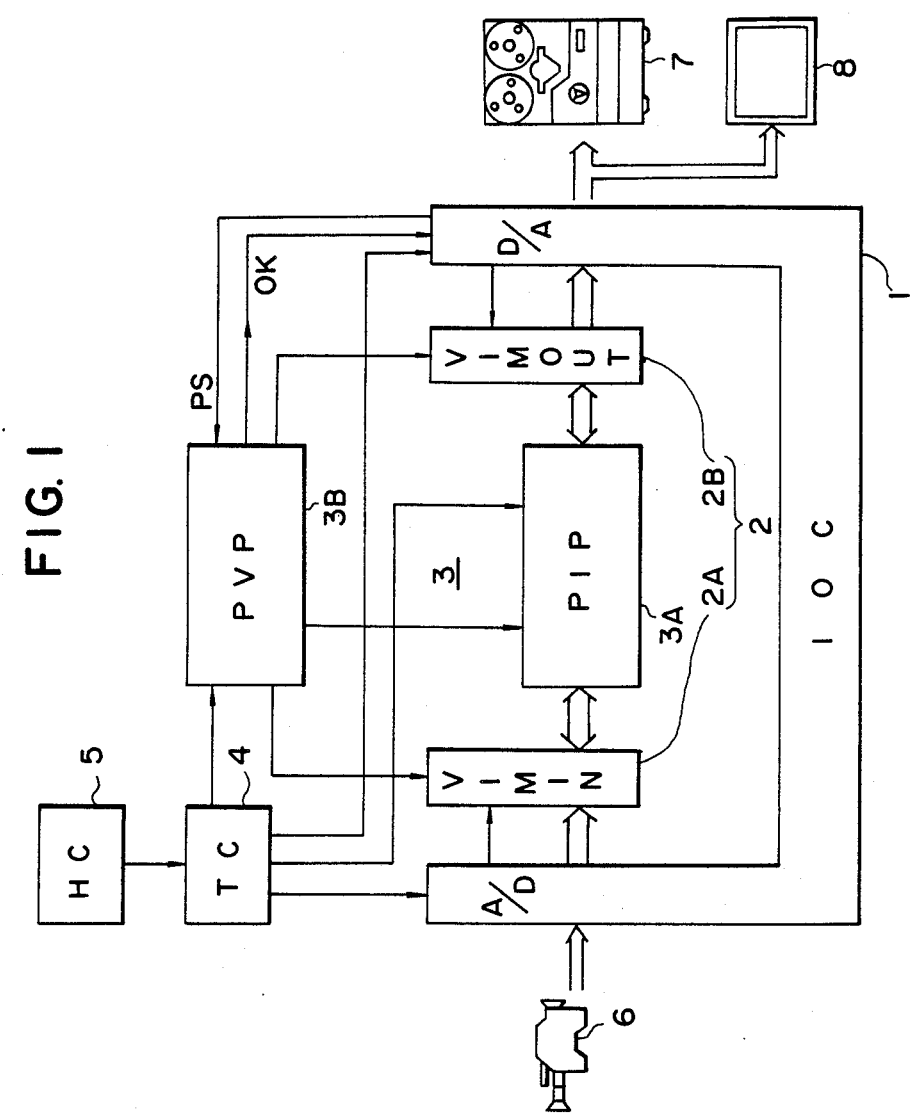
FIG. 1 is a conceptual drawing showing the whole of an image processing apparatus to which the apparatus of the present invention is applicable.
Figure 2:
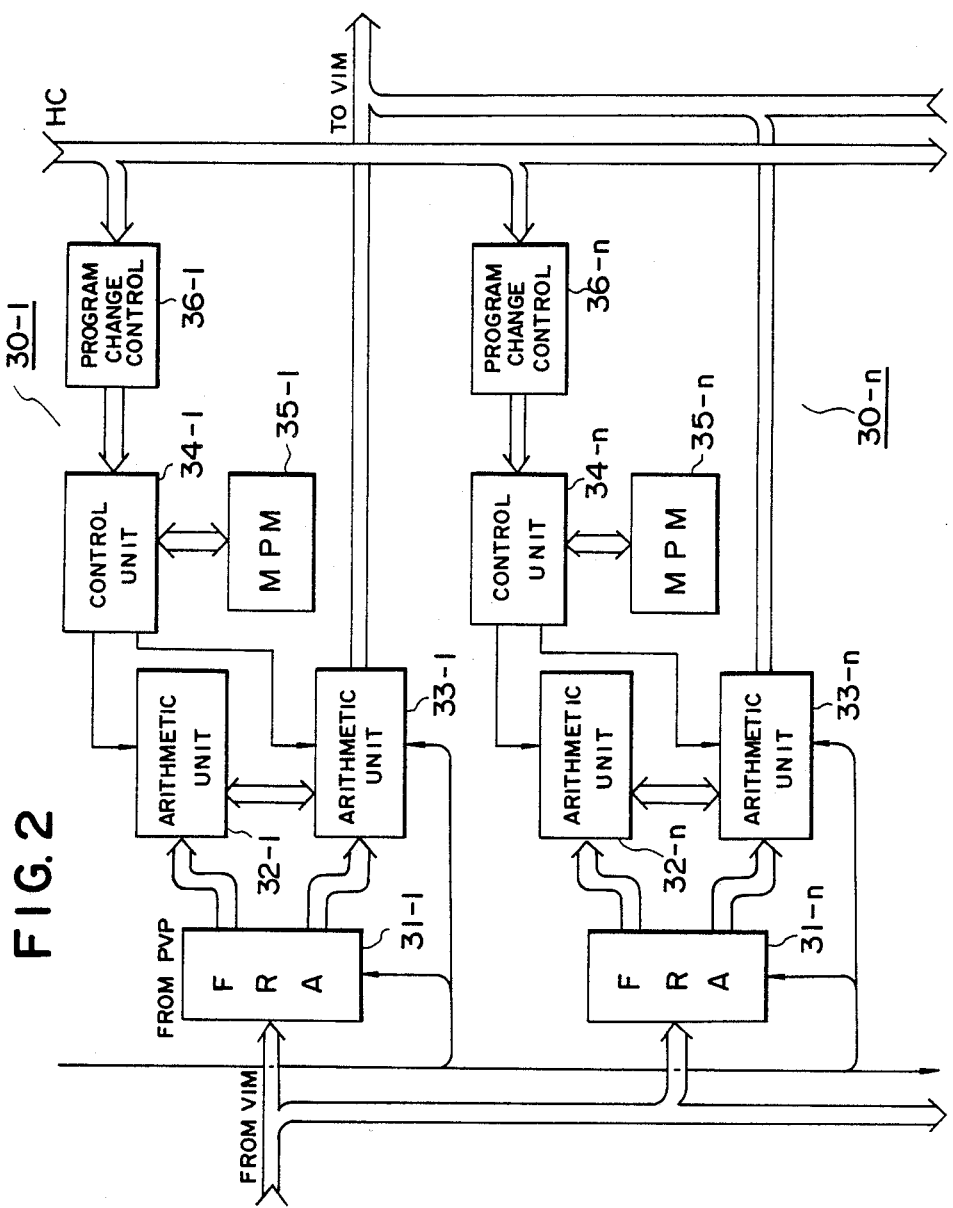
FIG. 2 is a block diagram showing an example of a main portion of the image processing apparatus of FIG. 1.

FIGS. 1 and 2 show image processing apparatus of a type disclosed in a copending application of Hasebe et al. Ser. No. 06/932,277, filed Nov. 19, 1986, and assigned to the assignee of the present application. Arithmetic processors according to the present invention are especially adapted for use in apparatus as shown in FIGS. 1 and 2.

FIG. 1 shows an example of video image processing apparatus for achieving high-speed data processing. The apparatus comprises an input/output portion 1 (hereinafter called an IOC), a memory portion 2 (hereinafter called a VIM) consisting of an input image memory 2A (hereinafter called a VIMIN) and an output image memory 2B (hereinafter called a VIMOUT), a data processing portion 3 consisting of a position stationary processor 3A (hereinafter called a PIP) mainly for calculating picture element values and a position variant processor system 3B (hereinafter called a PVP) for controlling data flows as by controlling addresses and for adjusting processes to coincide in timing, and a processor 4 (hereinafter called a TC) as a total controller for controlling execution and stopping of processes and exchange of programs. The TC 4 is provided with a host computer 5 (hereinafter called an HC) for controlling the entire video image processing apparatus.

The IOC 1 makes A/D (analog-to-digital) conversion of video signals coming from a video camera or VTR 6, for example, to provide digital image data, writes the digital image data in the VIMIN 2A, reads out processed image data from the VIMOUT 2B, and makes D/A (digital-to-analog) conversion of the processed image data to restore analog video signals, so that they may, for example, be recorded in a VTR 7 or supplied to a monitor receiver 8 to enable monitoring of the video image.

In the present case, the signals supplied as input and output are video signals of the NTSC system or the R-G-B system, and either of these systems is specified by the TC 4. A picture element is provided, for example, by 8-bit data.

The writing and reading of the image data into and out of the VIM 2 is performed in large blocks of image data, for example in blocks of a field or a frame. Therefore, each of the VIMIN 2A and the VIMOUT 2B is made up of a plurality sheets of memories, each having enough capacity for the image data of a field or a frame. For example, 12 sheets of 768×512 bytes may be employed as frame memories. In the present example, the use of these 12 sheets of frame memories is not fixed but can be flexibly allocated to either the VIMIN 2A or the VIMOUT 2B according to the purpose of the processing or the picture image as the object of the processing. Two sheets are used as one set, so that when one sheet is written, the other can be read, whereby processing from outside the VIM 2 by the IOC 1 and processing within the VIM 2 by the PIP 3A and the PVP 3B are performed in parallel.

A control mode signal determining whether the plurality of sheets of frame memories of VIM 2 should come under the control of the IOC 1 or under the control of the PVP 3B is issued from the IOC 1 and supplied to the VIM 2.

The data processing portion 3 comprises a processor, reads image data stored in the VIMIN 2A according to its program, processes the data in various ways, and writes the processed data in the VIMOUT 2B.

The data processing portion 3 is made up of the separated systems PIP 3A and PVP 3B operating in parallel; by virtue of such separated arrangement, the processing time consumed in the data processing portion is determined only by whichever is longer of the processing times taken by the two systems. In contrast, in the data processing portions of earlier image processing apparatus, the total processing time was determined by the sum of the processing times. In the present example, data processing is performed at such high rates that video data can be processed on a real-time basis.

The processing portion 3 is made up of one sheet or a plurality of sheets of processors, and the microprograms in the microprogram memories can be exchanged when the scope of the processing is enlarged.

The program exchange is carried out in this way: the microprograms are supplied from the HC 5 to the TC 4 in advance and stored, for example, in a RAM provided therein. Thereafter, when, for example, the user has made a request for exchanging some programs (by turning a switch on), the TC 4 supplies the programs to each of the processors.

The PIP 3A and the PVP 3B are basically of the same architecture. Each comprises an independent processor having a control unit, arithmetic unit, memory unit, and input/output port. Each is arranged in a multiprocessor structure made up of a plurality of unit processors and is constructed so that high-speed processing is achieved chiefly by adoption of a parallel processing technique.

The PIP 3A comprises, for example, 60 sheets of PIP processors and several sheets of subprocessors and processes image data coming from the VIM 2 or generates image data within the PIP 3A itself.

The PVP 3B comprises, for example, 30 sheets of processors and controls flows of image data inward from the VIM 2 such as allocation of the picture element data to the PIP 3A.

More particularly, the PVP 3B generates address data and control signals for the VIM 2 and supplies them to the VIM 2. It also generates input/output control signals and other control signals for the PIP 3A and supplies them to the PIP 3A.

The image data processing is not always conducted in such a manner that the data from a single sheet of a frame of the VIMIN 2A are processed and the processed data are written in the VIMOUT 2B, but sometimes data coming from a plurality of sheets of frame memories and extending over a plurality of sheets of frames are processed together.

The PIP 3A and PVP 3B employ 16-bit processing as a standard, and a speed is achievable that will enable the arithmetic processing of the image data of one frame within the time period of one frame, namely that will enable real-time processing. As a matter of course, there are also some processes that require longer processing time than one frame.

In the present case, the image data processing by the PIP 3A and PVP 3B is performed in synchronism with the video frames. Therefore, a process start timing signal PS in synchronism with each frame is supplied from IOC 1 to the PVP 3B. The signal PS is ordinarily at a high level and it is brought to a low level at the processing start time. On the other hand, a signal OK indicating that a process has been finished is supplied from the PVP 3B to the IOC 1. This signal OK is supplied by a processor at the core of the PVP 3B that provides timing control. The process start timing signal PS is generated in the IOC 1 based on a frame start signal indicating the first line of each frame and the process end signal OK.

When the processing is performed on a real time basis, since the signal OK is always obtained at the end of each frame, the signal PS becomes the same signal as the frame start signal.

On the other hand, when the processing time is longer than one frame, the signal PS does not coincide with the frame period but is obtained at the start of a frame after a signal OK has been supplied as an output.

When the processor at the core of the PVP 3B detects that the process start timing signal PS from the IOC 1 has been brought to the low level, this processor starts to run, and outputs, according to its controlling program, timing signals to other processors (including the PIP 3A), supplies addresses to the VIM 2, reads the image data from the VIM 2 and causes the same to be processed in the PIP 3A. When the processing has been finished, the same processor generates the signal OK and stops, waiting for issuance of the next process start timing signal PS.

In this case, only the image signal portion, excluding the synchronizing signal and burst signal, is taken as the object of processing, and the data read out from the VIM 2 does not include the synchronizing signal and burst signal. Therefore, the IOC 1 is provided with a ROM generating the synchronizing signal, burst signal, and the vertical blanking signal, and in the case of the NTSC signal, the data from the VIMOUT 2B (after being rearranged, if necessary) are transferred to the D/A converter of the IOC 1 together with the synchronizing signal, burst, signal, and vertical blanking signal.

Also in the case of the three primary color signals, an outer synchronizing signal becomes necessary. This signal is generated also in the IOC 1 and supplied to the monitor and other apparatus.

In this parallel processing system by the use of multiprocessors, the TC 4 effects synthetic control according to the three modes mentioned below. Execution of processes, stopping, and program transfer (exchange) are thus carried out consistently. Also, the transfer and execution are effectively conducted by using a slow clock and a fast clock at the times of the program transfer and the program execution, respectively.

FIG. 2 shows a concrete structure of the PIP 3A. Although the PIP 3A has, in reality, a large number (60 sets, for example) of processors arranged in parallel, only two sets of them are shown in the drawing. In this drawing, digital data from the VIM 2 are supplied to input register 31-1 to 31-$n$ (hereinafter called the FRA) provided for each of the n parocessors 30-1 to 30-$n$, and these registers are controlled by the PVP 3B in accordance with the address read out of the VIM 2 and stored with a predetermined amount of data necessary for each processor.

The data written in these registers 31-1 to 31-$n$ are supplied to arithmetic units 32-1, 33-1 to 32-$n$, 33-$n$, respectively. Each of the arithmetic units is provided with an adder/subtractor, multiplier, coefficient memory, data memory, etc., and makes linear and nonlinear data conversion calculations according to the control signal from the control units 34-1 to 34-$n$. Results of the calculations are obtained at the arithmetic units 33-1 to 33-$n$, and the arithmetic units 33-1 to 33-$n$ are controlled by the PVP 3B according to write addresses of the VIM 2, whereby the results of the calculations are written in necessary portions in the VIM 2.

The control signals from the control units 34-1 to 34-$n$ are formed according to the microprogram written in the microprogram memories (MPM) 35-1 to 35-$n$. The microprogram is written from the outside through program change controls 36-1 to 36$n$.

If the microprogram is formed by the host computer (HC) 5 (FIG. 1), etc., the transfer rate from the HC 5 to each MPM 35-1 to 35-$n$ is limited by the capacity of the line. It is possible to transfer the program only at the rate, for example, of 500 Kbytes/sec or so, and it takes a considerable amount of time for the rewriting in all of the MPMs 35-1 to 35-$n$. Since processing in the PIP 3A, etc., is impossible during that time, substantial drawbacks are experienced. And, since the transfer cannot be performed until the processing in the PIP 3A, etc., has been finished, the HC has to wait until it is finished, and the efficiency of usage of the HC is considerably lowered.

Earlier Arithmetic Processor

In the apparatus described above, each arithmetic unit 32,33 of each processor section 30 constituting the PIP 3A is provided with a so-called multiplier.

Figure 3:
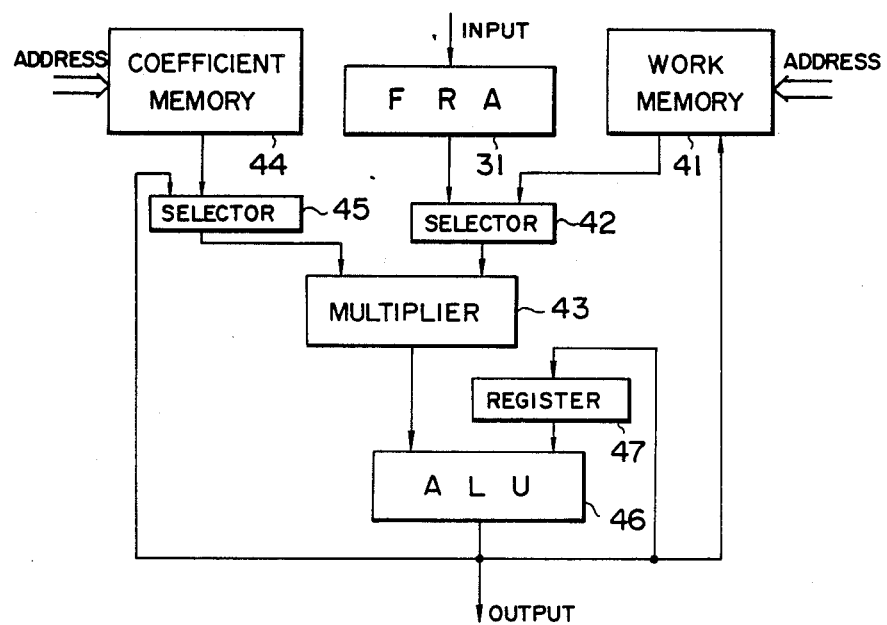
FIG. 3 is a block diagram of an earlier but not publicly disclosed arithmetic unit for use in the apparatus of FIG. 2.

FIG. 3 shows a primary portion of an earlier arithmetic unit known to the inventor but not publicly disclosed and not claimed herein, in which data from the FRA 31 and data from the work memory 41 to be described later are supplied via a selector 42 to an input of a multiplier 43, and data from a coefficient memory 44 and data from an arithmetic logic unit (ALU) 46 to be described later are supplied via a selector 45 to another input of the multiplier 43. Output data from the multiplier 43 is supplied to an input of the ALU 46, which delivers output data therefrom to the work memory 41 and via a register 47 to another input of the ALU 46.

In a case where the work memory 41 is not provided, the selector 42 is unnecessary; and in a case where the output from the ALU 46 is not supplied to the multiplier 43, the selector 45 is unnecessary.

In general, the multipliers used for this kind of digital operation require that the absolute values of each of two numbers to be multiplied be less than 1. Of course, data to be supplied to the FRA 31 can be adjusted to have an absolute value less than 1, for example, by setting the dynamic range to less than 1. However, the coefficient to be multiplied is required to be at least 1 in some cases.

To cope with this situation, in FIG. 3, a coefficient having a value of at least 1 is subdivided into a plurality of coefficients each having a value less than 1. Each coefficient is then multiplied by the input data, and the results are added to obtain the product as a total. For example, in FIG. 3, the data from the FRA 31 and the coefficient less than 1 from the coefficient memory 44 are supplied to the multiplier 43. The resultant product is supplied to an input of the ALU 46, which operates as an adder, and an output from the ALU 46 is delivered via the register 47 to another input of the ALU 46.

In this circuit, assuming the input data and the coefficient to be x and a ($|a|<1$), respectively, the arithmetic processing is executed in such a way that the input data x and the coefficient a are supplied to the multiplier 43 in the first step, the product ax is obtained and is loaded in the output register of the multiplier 43 in the second step, and then the product is extracted via the ALU 46. Consequently, when the absolute value of the coefficient is less than 1, the product can be obtained in three steps.

In contrast, when the absolute value of the coefficient is at least 1 and less than 2, the arithmetic operation is conducted with the coefficients (a+b: $|a|$, $|b|<1$). In this case, four steps are required to obtain the product: the input data x and the coefficient a are supplied to the multiplier 43 in the first step; the input data x and the coefficient b are supplied to the multiplier 43 immediately after the product ax is supplied to the output register of the multiplier 43 in the second step; the product bx is supplied to the output register of the multiplier 43 immediately after the product ax is supplied from the output register via the ALU 46 to the register 476 in the third step; and the ALU 46 adds the bx in the output register of the multiplier 43 to the ax in the register 47, thereby obtaining (a+b)x, in the fourth step. Since four steps are required to obtain the product when the absolute value of the coefficient is at least 1 and less than 2, the required period of time is greater by the time of one step than the period of time required when the absolute value of the coefficient is less than 1.

It can easily be seen that, if the absolute value of the coefficient is at least 2 and less than 3, five steps are required by the apparatus of FIG. 3 to obtain the product.

In a case where the processing time required for a given kind of arithmetic operation varies depending on the numbers to be subjected to the operation, the processing program is designed to accommodate the operations that require the greatest period of time for their execution. This causes some of the time during the execution of other operations to be wasted. In addition, it is not easy to design the processing program to take the variations of the processing time into account. The interval of time required to perform one step described above is quite short; however, such an operation is repeated a tremendous number of times in graphic processing and the like. In such a case, the short interval of time is accumulated over and over, which results in a substantial delay.

In the technique described above, many arithmetic processing steps are required to perform a multiplication with a coefficient of which the absolute value is at least 1, thereby leading to the problem that a substantial delay is caused.

In the apparatus described above, the output result of the arithmetic operation of the ALU 46 is supplied also to the work memory 41, and thereafter arithmetic processing is executed in some cases by using the data written in the work memory 41 and the data latched in the register 47. The amount of data necessary for the processing varies depending on the content of the processing, and the amount of data to be written in the FRA 31 is greatly changed especially when the apparatus is used as a general-purpose processing system. In ordinary processing, it is unnecessary to allocate the capacity of the write data of FRA 31 according to the maximum amount of the required data; however, the efficiency of the read/write operations may deteriorate in some cases.

In a case where so-called shading processing of a solid spherical image is performed by the apparatus described above, an inner product is calculated from the unit vector of the light source and the normal vector at any given point on the surface of the image to obtain the brightness at that point. In order to obtain the normal vector in this case, it is necessary to perform processing such as look-up table (LUT) processing and squaring of the data from the coefficient memory 44 and the FRA 31. When a squaring of the coefficient is performed in the arithmetic sections 32-1 to 32-n and 33-1 to 33-n of each processor section 30-1 to 30-n (FIG. 2) constituting the PIP 3A (FIG. 1) described above, the coefficient from the coefficient memory 44 (FIG. 3) is supplied to the work memory 41 through the selector 45, the multiplier 43, and the ALU 46, and then the coefficient stored in the work memory 41 is supplied via the selector 42 to an input of the multiplier 43. At the same time, the coefficient from the coefficient memory 44 is supplied via the selector 45 to another input of the multiplier 43, and the obtained product (square of the coefficient) is supplied as an output by the ALU 46.

When a squaring operation is to be performed on data, the data from the FRA 31 is supplied to the work memory 41 and the register 47 through the selector 42, the multiplier 43, and the ALU 46, and then the data stored in the work memory 41 is supplied via the selector 42 to an input of the multiplier 43. At the same time, the data from the register 47 is delivered to another input of the multiplier 43 through the ALU 46 and the selector 45, and then the resultant product (squared value) is supplied as an output by the ALU 46.

In the apparatus of FIG. 3, however, to use the work memory 41 for intermediate processing in the arithmetic operation complicates the address generation, and the operating efficiency may deteriorate when, for example, a coefficient is squared in LUT processing.

Arithmetic Processor According to the Invention

In accordance with the present invention, the processing time required for the arithmetic operations described above is significantly reduced.

Figure 4:
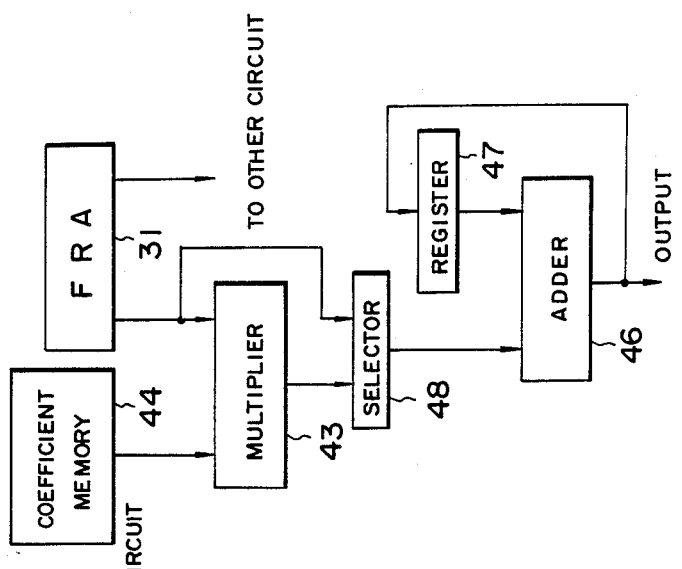
FIGS. 4–9 are block diagrams of respective preferred embodiments of arithmetic units in accordance with the invention that can be substituted for the arithmetic unit of FIG. 3.

FIG. 4 shows one preferred embodiment of apparatus constructed in accordance with the invention. In the apparatus of FIG. 4, data x from the FRA 31 and a coefficient a from the coefficient memory 44 (assumed for the moment to have a value less than 1) are supplied to the multiplier 43, and the resultant product ax is delivered to a first input of a selector 48, which may be formed of tri-states. Data from the FRA 31 is sent directly to a second input of the selector 48, and the data from the FRA 31 is further supplied via a delay register 49 to a third input thereof. The data selected by the selector 48 is supplied to an input of the adder 46. The output of the adder 46 is supplied via the accumulator register 47 to another input of the adder 46.

As indicated above, it is assumed that the input data and the coefficient are x and a, respectively. The arithmetic processing is then performed as follows: the input data x and the coefficient a are supplied to the multiplier 43 in the first step; the (partial) product ax is stored in the output register of the multiplier 43 in the second step; and the (final) product ax is obtained through the selector 48 and the adder 46 in the third step. Consequently, when the absolute value of the coefficient is less than 1, the product is obtained in three steps, first as in the case of the apparatus of FIG. 3.

In contrast, when the absolute value of the coefficient is at least 1 and less than 2, the apparatus of FIG. 4 requires fewer steps than the apparatus of FIG. 3 to complete the calculation. In this case, the calculation is performed with the coefficient (a+1: $|a|<1$). The input data x and the coefficient a are supplied to the multiplier 43, and, at the same time, the input data x is supplied to the delay register 49 in the first step; the partial product ax is supplied to the output register of the multiplier 43, and, at the same time, the data x supplied to the delay register 49 is delivered to the register 47 via the selector 48 and the adder 46 in the second step; and then the adder 46 adds the partial product ax received from the output register of the multiplier 43 to x received from the register 47, thereby obtaining the final product $1+a$) x in the third step. Consequently, when the absolute value of the coefficient is at least 1 and less than 2, the final product is obtained also in just three steps, in contrast to the four steps required by the apparatus of FIG. 3.

When the absolute value of the coefficient is at least 2 and less than 3, the arithmetic operation is effected with the coefficient (a+2: $|a|<1$). In this case, the input data x and the coefficient a are supplied to the multiplier 43, and, at the same time, the input data x is delivered to the delay register 49 and via the selector 48 and the adder 46 to the register 47 in the first step; the partial product ax is supplied to the output register of the multiplier 43, and, at the same time, the sum $x+x=2x$ produced by the adder 46 is delivered to the register 47 in the second step; and the partial product ax of the output register of the multiplier 43 and the sum 2x stored in the register 47 are added in the adder 46, thereby obtaining the final product $(2+a)x$, in the third step. Consequently, when the absolute value of the coefficient is at least 2 and less than 3, the final product is obtained also in just three steps, in contrast to the five steps required by the apparatus of FIG. 3.

Thus, unlike the apparatus of FIG. 3, the apparatus of FIG. 4 described above can obtain the final product in just three steps (one step for the input and two steps for the processing) whenever the absolute value of the coefficient is at least 1 and less than 3. In many applications of the invention, this encompasses all of the cases of interest. As a consequence, no provision need be made for additional delay time when the absolute value of the coefficient is within that range, and the arithmetic processing time can be minimized and held constant. In addition, the processing program can also be quite easily created.

If a detection circuit (not shown) in the selector 48 is supplied with the output of the coefficient memory 44, including the integral portion thereof, the selector 48 can select the input data automatically.

Practically, however, the data contents of the coefficient memory 44 (including only the respective a portions of the coefficients) are stored simultaneously when the program for the processor is stored in the microprogram memories 35-1 to 35-n (FIG. 2). Since only the a part of each coefficient is stored, the selector is controlled by the program. The same is true of the other selectors described below.

In the apparatus of FIG. 4 described above, for arithmetic processing with a coefficient of which the value is 1, the input data x from the FRA 31 can be directly obtained through the selector 48 and the adder 46 in the first step, and the processing time can be greatly reduced as compared with the conventional case where the input data x is obtained through the multiplier and the arithmetic operation is executed with the coefficient (0.5×0.5).

Figure 11:
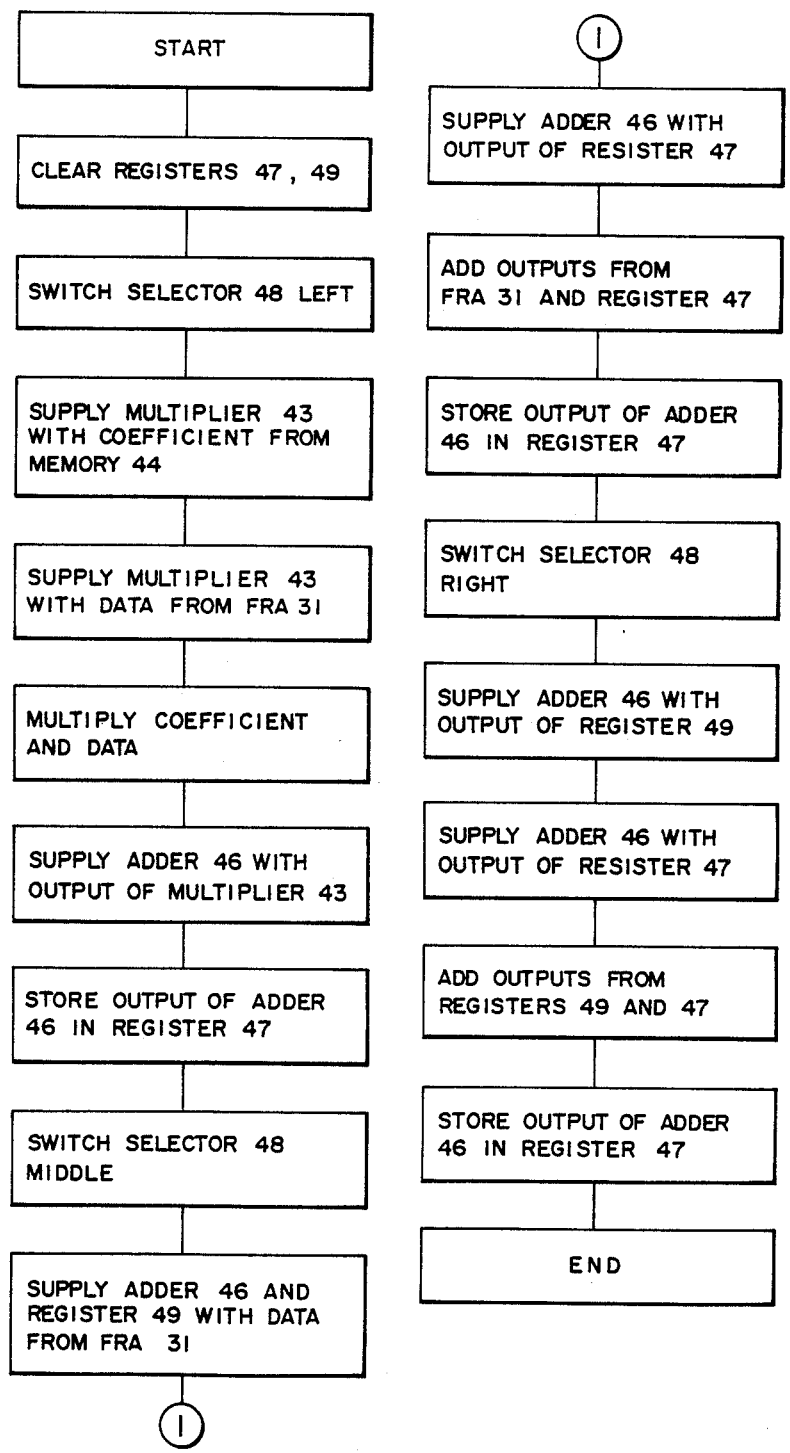
FIG. 11 is a flowchart illustrating the operation of a preferred embodiment of an arithmetic unit in accordance with the invention.

FIG. 11 is a flowchart illustrating the operation of the embodiment of FIG. 4 where the coefficient is at least two (if the coefficient is less than 2, the flowchart can be shortened). The selector 48 is stepped to its left position and the coefficient from the memory 44 and data from the FRA 31 are supplied to the multiplier 43. The multiplication output of the multiplier 43 is supplied to the adder 46, and the output of the adder 46 is accumulated a first time in the register 47. The selector 48 is stepped to its center position, and the adder 46 and the register 49 receive data from the FRA 31. The adder 46 receives the output of the register 47 and adds it to the data from FRA 31 to produce a sum that is stored in the register 47. The selector 48 is stepped to its right position, and the adder 46 receives the output of the registers 49 and 47 and produces a sum that is accumulated a third time in the register 47. In the light of FIG. 11, those skilled in the art will be able to prepare a flowchart for the other embodiments of arithmetic processors according to the invention on the basis of the description below of their structure and function.

Figure 5:
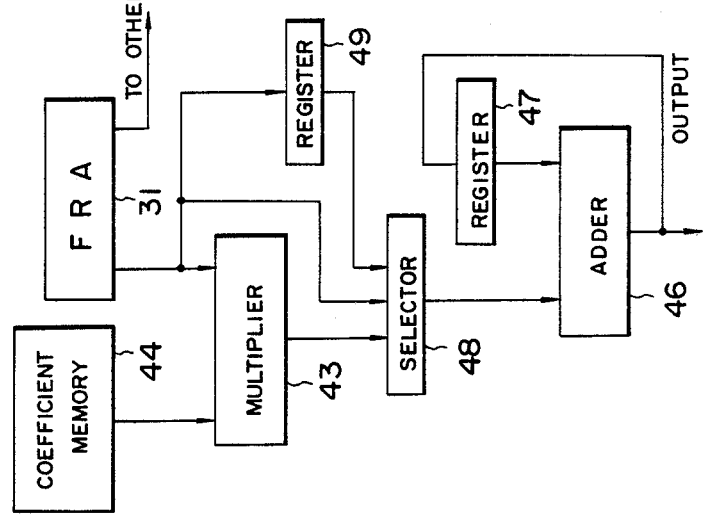

If the absolute value of the coefficient can be restricted to have a value less than 2, the register 49 can be omitted, as in FIG. 5. In this case, when the program is designed to cause the output register of the multiplier 43 to be "transparent", the partial product derived by the multiplier 43 can be immediately supplied to the adder 46 in the second step, so that the arithmetic operation can be performed in just two steps (one step for the input and one step for the processing).

According to the present invention, a bypass is established around the multiplier and hence multiplication with a numeric value of which the absolute value is at least 1 can be quite easily performed.

Figure 6:
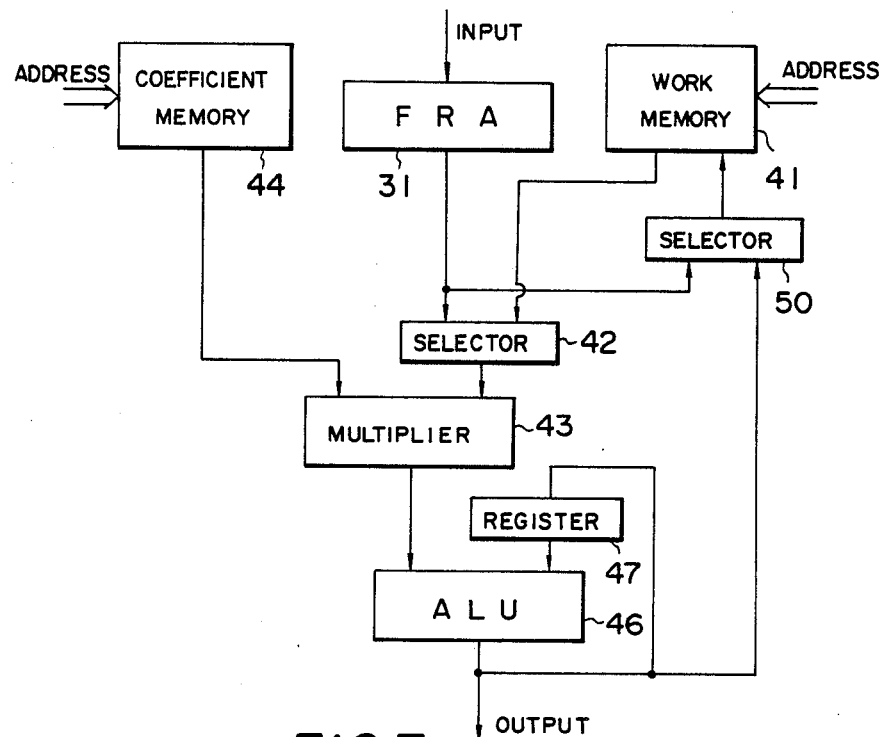

FIG. 6 shows another embodiment of apparatus constructed in accordance with the invention. In this figure, the data from the FRA 31 and the data from the work memory 41 to be described later undergo a selection in the selector 42 so as to be supplied to an input of the multiplier 43. At the same time, the data from the coefficient memory 44 is delivered to another input of the amplifier 43. Output data from the multiplier 43 is supplied to an input of the arithmetic logic unit (ALU) 46. The output of the ALU 46 and the data from the FRA 31 are supplied to the selector 50, and the selected data is delivered to a write input of the work memory 41. The output of the ALU 46 is delivered via the register 47 to another input of the ALU 46.

The data supplied to the FRA 31 in this apparatus is supplied via the selector 42 to the multiplier 43 and is then multiplied by a coefficient from the coefficient memory 44. The resultant data is supplied to the ALU 46. The data is further subjected to an operation such as addition to the data from the register 47, and the resultant output of the operation is extracted. At the same time, the output is delivered to the work memory 41 (via the selector 50) and to the register 47, and thereafter the arithmetic processing is executed by use of the data written in the work memory 41 and the data latched in the register 47.

In this apparatus, the data supplied to the FRA 31 is supplied via the selector 50 to the work memory 41.

Consequently, in this apparatus, when the amount of the input data exceeds the capacity of the FRA 31, the excess data can be supplied via the selector 50 to the work memory 41 so as to be stored therein. Even when a great amount of data is to be processed, the FRA 31 need only have a small capacity, since the excess data can be written in the work memory 41. A great amount of data can thus be handled without lowering the efficiency of the FRA 31, which facilitates efficient processing regardless of the amount of data.

The read/write operations in the work memory 41 can be effected in concurrence with the arithmetic operation such as multiplication, and hence the efficiency of the processing does not deteriorate.

According to the present invention, when the input data exceeds the capacity of the input register, the excess data can be written in the work memory, and hence the data can be effectively processed with a small input register regardless of the amount of data.

In this apparatus, the data supplied to the FRA 31 is delivered via the selector 50 to the work memory 41 so as to be written therein. Moreover, the data read from the work memory 41 and the data from the FRA 31 are delivered via the selector 42 to the multiplier 43, which effects a multiplication with the coefficient from the coefficient memory 44, and the resultant data is supplied to the ALU 46. The obtained data and the data from the register 47 are subjected to an operation such as addition to obtain the output of the arithmetic operation, and the output is supplied to the work memory 41 via the selector 50 and to the register 47. Thereafter, the arithmetic operation is performed by using the data written in the work memory 41 and the data latched in the register 47.

In the apparatus described above, when an operation such as so-called filter processing or convolution processing is to be executed, a part of a series of data or a partial series of data is written in the work memory 41, and this data and the coefficient from the coefficient memory 44 are subjected to multiplication and addition by use of the multiplier 43 and the ALU 46. In this case, however, a predetermined period of time is necessary to write in the work memory 41 the partial series of data required in the filter processing, and the arithmetic processing cannot be carried out at the same time. As a result, the processing efficiency deteriorates.

In so-called filter processing, the partial series of data to be used in the arithmetic operation is sequentially processed in the overlapped state; consequently, in many cases, an arbitrary portion of the series of data is repetitively used by shifting the sequence of the series of data when the processing is next executed.

Figure 7:
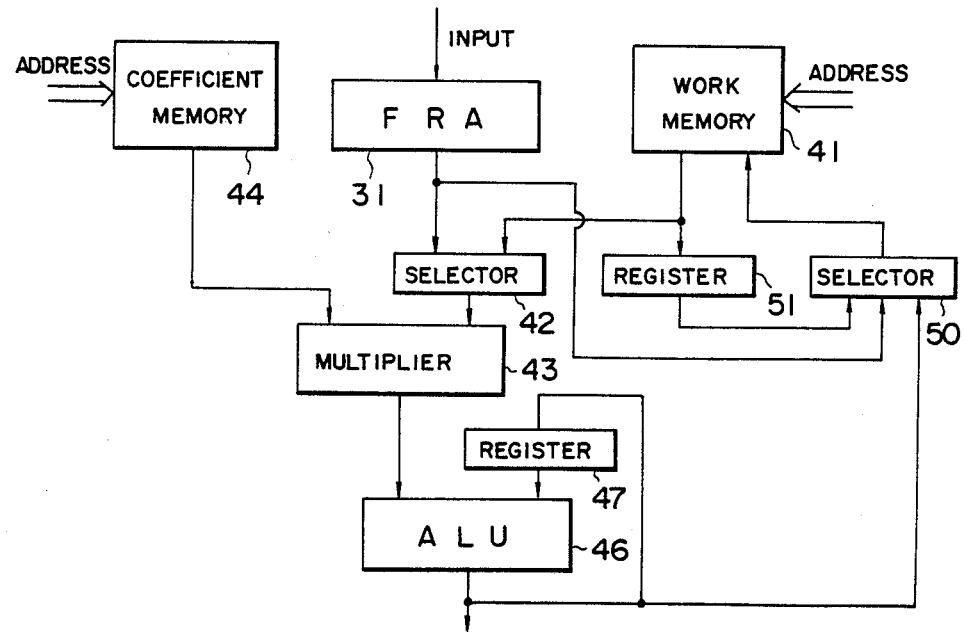

In the embodiment of FIG. 7, the data from the FRA 31 and the data from the work memory 41 to be described later are subject to a selection in the selector 42 and the selected data is supplied to an input of the multiplier 43. At the same time, the data from the coefficient memory 44 is delivered to another input of the multiplier 43. The multiplication output of the multiplier 43 is delivered to an input of the ALU 46, and the output of the ALU 46 is supplied via the register 47 to another input of the ALU 46. The data from the work memory 41 is supplied to the register 51. The data from the register 51, the data from the FRA 31, and the output of the ALU 46 are supplied to the selector 50. The selected data from the selector 50 is delivered to the write input of the work memory 41.

The data supplied to the FRA 31 in this apparatus is supplied via the selector 50 to the work memory 41 so as to be written therein. The data read from the work memory 41 and the data from the FRA 31 are delivered via the selector 42 to the multiplier 43, which effects a multiplication with the coefficient from the coefficient memory 44. The resultant data is delivered to the ALU 46. The output of the multiplier 43 and the data from the register 47 are subjected to an operation such as addition, and the obtained output is supplied to the work memory 41 (via the selector 50) and to the register 47. Thereafter, arithmetic processing is effected by using the data written in the work memory 41 and the data latched in the register 47.

The data read from the work memory 41 is fed to the register 51, and the data from the register 51 is rewritten in the work memory 41 via the selector 50.

Consequently, in this apparatus, the data written in the work memory 41 is read and is subjected to an arithmetic operation. At the same time, the data can be rewritten in the work memory 41 via the selector 50. Thus, any data in the partial series of data to be used also in the next processing is latched in a register and the latched data is rewritten at an address that has undergone a necessary shift; that is, the amount of data to be written can be reduced and hence the time required to write the data is minimized.

For example, in a case where a one-address shift for the next processing is to be executed, while the data is read and is subjected to an arithmetic processing, the data is latched in the register 51; and when the next data is read after the processing, the data of the register 51 is rewritten at the address from which the readout has been effected. As a result, the data is shifted and is rewritten. At the same time, the system constituted by the register 51 and the work memory 41 is separated from the arithmetic section; consequently, the rewrite operation can be accomplished in concurrence with the arithmetic processing, which greatly increases the processing efficiency.

According to the present invention, since the data written in the work memory can be rewritten through the sequential shift operation, the necessary portion of the partial series of data can be rewritten for storage and thus the amount of data written in the respective processings is reduced, thereby minimizing the write time and improving the processing efficiency.

Figure 8:
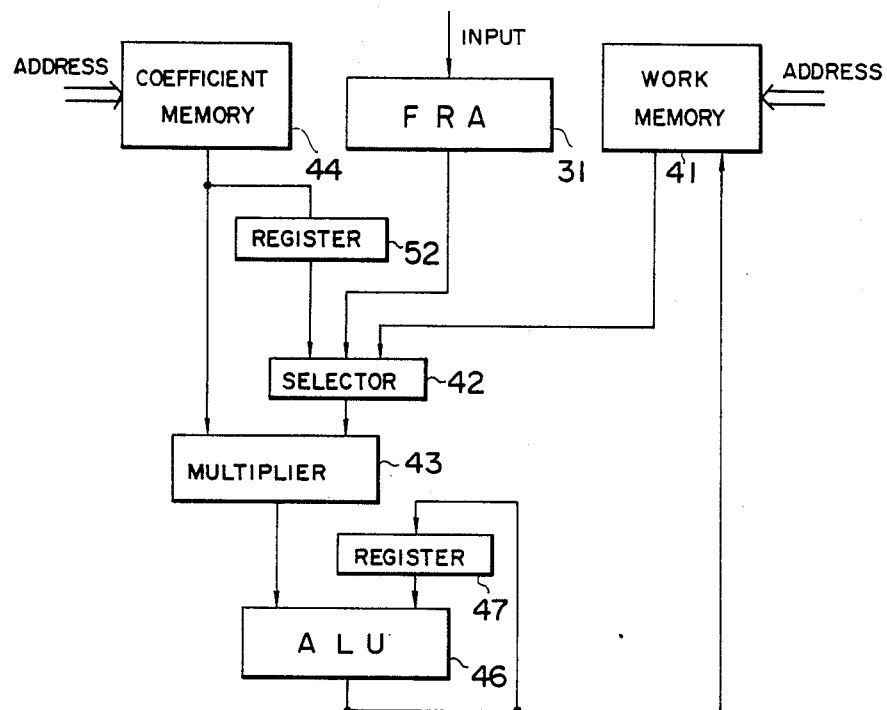

In the embodiment of FIG. 8, the data from the FRA 31 and the data from the work memory 41 are supplied to the selector 42, and the selected data is delivered to an input of the multiplier 43. The data from the coefficient memory 44 is supplied to another input of the multiplier 43. The data from the coefficient memory 44 is supplied also to a register 52. The output of the multiplier 43 is fed to an input of the ALU 46, which delivers output data therefrom to the work memory 41 and via the register 47 to another input of the ALU 46. The register 52 may alternatively be connected to the other input terminal of the multiplier 43.

In a case where the square of a coefficient is to be calculated by this apparatus, the coefficient from the coefficient memory 44 is supplied to the register 52, and the data from the register 52 is delivered via the selector 42 to an input of the multiplier 43. At the same time, the same coefficient from the coefficient memory 44 is fed to another input of the multiplier, and the obtained product (square of the coefficient) is supplied as an output by the ALU 46.

Since the output of the coefficient memory 44 is supplied to both inputs of the multiplier 43, the square is quite simply calculated. With this provision, operations such as the square of a coefficient and the multiplication of two coefficients can be simply accomplished, for example in LUT processing, which considerably increases the efficiency of the arithmetic operation.

According to the present invention, the provision of a circuit for applying the output of the coefficient memory 44 to both inputs of the multiplier 43 facilitates such operations as the squaring of a coefficient in LUT processing and the like.

Figure 9:
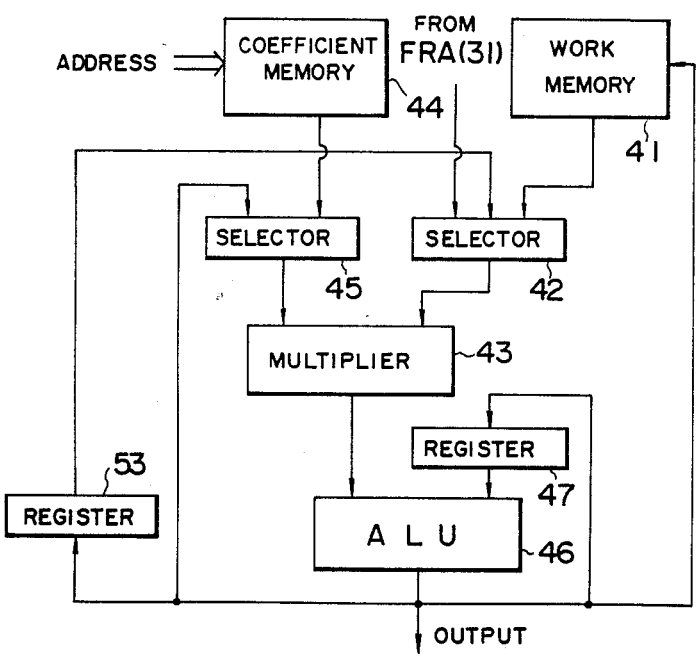

In the embodiment of FIG. 9, the data from the FRA 31 and the data from the work memory 41 are supplied to the selector 42, and the selected data from the selector 42 is supplied to an input of the multiplier 43. The data from the coefficient memory 44 and the output of the ALU 46 are supplied to the selector 45, and the selected data therefrom is supplied to another input of the multiplier 43. The output of the multiplier 43 is fed to an input of the ALU 46, and the output from the ALU 46 is supplied to the selector 45, the register 53, and the work memory 41 and is further supplied via the register 47 to another input of the ALU 46 at the same time. The register 53 may alternatively be connected to the other selector 45.

In a case where the square of data from the FRA 31 is to be calculated, the data from the FRA 31 is fed to the registers 47 and 53 via the selector 42, the multiplier 43, and the ALU 46. Next, the data from the register 53 is delivered via the selector 42 to an input of the multiplier 43; at the same time, the data from the register 47 is fed to another input of the multiplier 43 via the ALU 46 and the selector 45. The obtained product (square of the data) becomes the output of the ALU 46.

Since the output from the ALU 46 can be supplied to both inputs of the multiplier 43, the squaring operation can be quite easily performed. In addition, since the output of the ALU 46 can be supplied to either input of the multiplier 43, the output from the ALU 46 can be arbitrarily multiplied by the coefficient from the memory 44, the output of the ALU 46, the data from the FRA 31, or the data from the work memory 41, thereby considerably improving the efficiency of the arithmetic operation.

According to the present invention, there are provided respective routes for supplying the output from the ALU to two inputs of the multiplier, which greatly facilitates arithmetic operations such as the squaring of numeric data.

Figure 10:
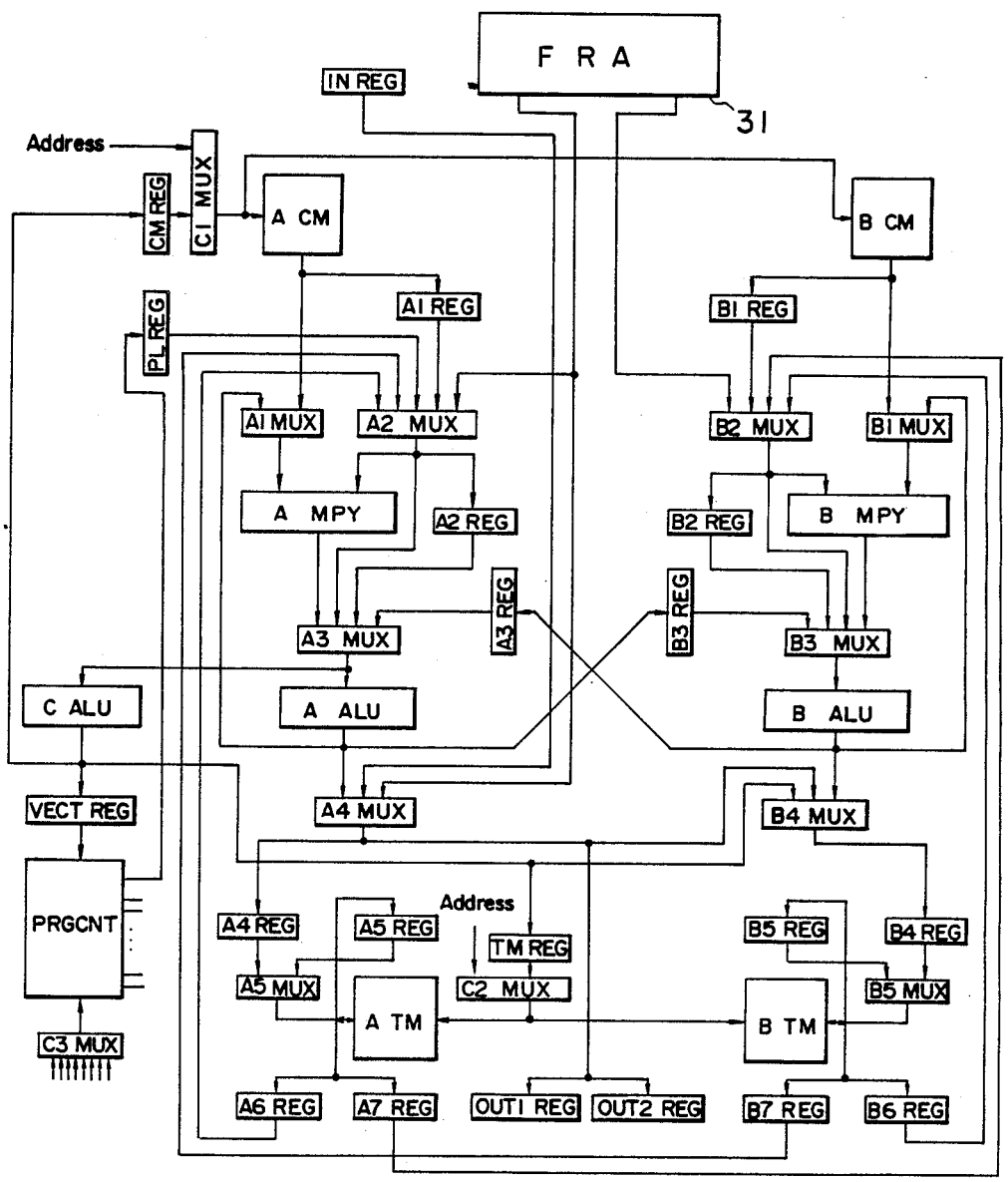
FIG. 10 is a block diagram showing the incorporation of the structures of FIGS. 4–9 to form a pair of arithmetic units for use in the apparatus of FIG. 2.

FIG. 10 shows a preferred embodiment of apparatus according to the invention applied to the arithmetic sections 32-1 to 32-$n$ and 33-1 to 33-$n$ (FIG. 2) of the PIP 3A (FIG. 1) of the digital signal processing system.

In FIG. 10, the arithmetic section of the PIP comprises two systems including parts A (on the left side of the figure) and B (on the right side of the figure). Each part comprises a coefficient memory, a work memory, a multiplier, an ALU and a register to perform the basic arithmetic operations necessary to effect the signal and graphics processing.

Each of the coefficient memories A CM and B CM includes $1024 \times 16$ bits, and the memory contents can be exchanged through the program change control 36-1 to 36-$n$ (FIG. 2) of the PIP. However, the contents cannot be read from apparatus on the PIP. The coefficient memory is disposed to store data such as coefficients necessary for the processing. For example, the coefficients of a digital filter, sine and cosine values of FFT (fast Fourier transform), and addresses of the A CM and B CM are commonly used. However, no problem arises, because the contents of the A CM and B CM can be independently supplied by the TC 4. The output from the A CM is supplied as an input to the A1 MUX of A1 REG, and the output from the B CM is supplied as an input to the B1 MUX or B1 REG. The contents of the A1 REG and B1 REG are delivered to the respective outputs at the next clock pulse CLK.

Each of the multipliers A MPY and B MPY is a 16 bit $\times$ 16 bit parallel multiplier. Input x of the A MPY is supplied with the output value of A CM selected by the A1 MUX or the output value of the A ALU, whereas input y is supplied with one of the output values of the A1 REG, PL REG, A6 REG, B7 REG, or FRA selected by the A2 MUX. The PL REG is a register circuit in which the PL value of the microprogram is stored. (Refer to a manual of Advanced Micro Device AM2910. The micro instructions are stored with condition or jump addresses and can also be the stored data itself.) The A6 REG and B7 REG are register circuits to store the outputs from the work memories A TM and B TM, respectively. The FRA 31 comprises a group of shift registers having a variable structure and being controlled by the processors (PVP 3B and TC 4) other than the PIP 3A and is used as an external input port of the PIP 3A. The structure can be changed according to the processing and can be shifted when necessary. The output from the multiplier A MPY includes 32 bits. From the output, the 16-bit MSB and the 16-bit LSB can be respectively extracted in different cycles. The 16-bit LSB may be obtained from the y input. The A1 REG is disposed to enable a squaring of the contents of the A CM and a multiplication of the different contents. Part B is nearly the same as part A. However, the output of the PL REG cannot be selected by the B2 MUX, which has only four inputs instead of the five of the A2 MUX. Since the FRA 31 has two ports, the same data can be read from parts A and B at the same time.

Each A ALU and B ALU is an arithmetic logic unit in which logical operations such as addition, subtraction, OR, and AND can be performed. The A ALU is supplied with the output of the A MPY, the selection output of the A2 MUX, the output of the A2 REG, or the output of the A3 REG. The B ALU is supplied with the output of the B MPY, the selection output of the B2 MUX, the output of the B2 REG, or the output of the B3 REG. More strictly, the MUX selection results in a selected output or no selection. The A2 REG and the B2 REG are employed because neither the A MPY nor the B MPY can perform a multiplication on an input having a value equal to or more than one. For example, in a case where a coefficient of 1.5 is multiplied by an input from the FRA 31, the multiplier multiplies the input by 0.5. At the same time, the data is sent to the A2 REG or the B2 REG, thereby accomplishing a multiplication with a coefficient equal to or more than one. The A3 REG and the B3 REG link part A to part B. For example, these registers are used in a case where an operation to obtain a sum of products in a digital filter is performed in parts A and B and each output is used to obtain a final result. The output from the A ALU is fed to the A4 MUX, the A1 MUX, and the B3 REG, whereas the output from the B ALU is delivered to the B4 MUX, the B1 MUX, and the A3 REG. The A4 MUX is used to select one of the outputs from the A ALU, the IN REG, and the FRA 31.

The IN REG is an external input port. The output selected by the A4 MUX is supplied to the A4 REG, the OUT1 REG, the OUT2 REG, and the B4 MUX. The A4 REG is used to store the input to the work memory A TM. The OUT1 REG and the OUT2 REG are output ports of the PIP and are controlled so that data can be independently sent thereto. The B4 MUX is used to select one of the outputs of the B ALU, the A4 MUX, and the C ALU.

The outputs of the A4 REG and the A5 REG undergo a selection by the A5 MUX, and the selected output is stored in the A TM, the A6 REG, and A7 REG and the A5 REG. The data can be naturally stored in any one thereof. The A TM has a bidirectional input/output function. When an output is effected by the A TM, neither of the outputs from the A4 REG and the A5 REG is selected by the A5 MUX, and the output of the A TM is stored in the A5 REG, the A6 REG, and the A7 REG. The A5 REG serves to shift the address of the A TM. More concretely, the delay processing of the digital filter can be effectively performed. The A7 REG is a register to send data from part A to part B. The output of the A7 REG is delivered to the B2 MUX. This provision is effective for a shading operation in which data is squared in part A and the resultant data is multiplied by a value in part B. Since this applies also to part B, the description thereof will be omitted.

The C ALU is located at an intermediate point between the arithmetic section and the control section. The data selected by the A3 MUX is supplied as an input to the C ALU and, after undergoing an arithmetic operation in the C ALU, is transmitted to the CM REG, the TM REG, the VECT REG, and the B4 MUX. The arithmetic function of the C ALU is the same as that of the A ALU and the B ALU. The CM REG is a register circuit to store the addresses of the coefficient memories A CM and B CM, and the TM REG is a register circuit to store the addresses of the work memories A TM and B TM. The VECT REG is a register circuit to store the iteration count of a program loop and the jump destination to be used in the program controller (PRGCNT) of the control section. Through the bus to the B4 MUX, the result of an arithmetic operation in the C ALU can be returned to the processing section. This enables use of the C ALU also as an auxiliary apparatus for the A ALU and the B ALU.

With the provision of the CM REG and TM REG, the data of the processing section can be used as addresses of the coefficient memory and the work memory, and hence look-up table processing is facilitated. In a case where FFT (fast Fourier transform) processing is to be effected, butterfly operation is achieved by use of the A MPY, the A ALU, the B MPY, and the B ALU, and the addresses of the A TM and the B TM storing data and the addresses of the A CM and the B CM containing coefficients (sin, cos) are computed by use of the C ALU. For butterfly operation, the real part and the imaginary part of each complex number are processed simultaneously in parts A and B, respectively. Since the arithmetic operations of the real and imaginary parts can be accomplished at the same time, the load of the addressing operation for the data and coefficients can be reduced; consequently, the overall processing efficiency is improved and the processing speed is increased. This is an effect obtained by the provision of two systems including parts A and B. The TM REG and the CM REG comprise four registers, and hence the same address need not be calculated in the C ALU, which increases the efficiency thereof.

Although, in this example, because of physical restrictions such as the size of the circuit board, parts A and B are not symmetrical, the circuits may be made symmetrical.

Many modifications of the preferred embodiments of the invention disclosed above will readily occur to those skilled in the art upon consideration of this disclosure. All such modifications are intended to be included within the invention, and the invention is limited only by the appended claims.

What is claimed is:

1. An arithmetic processor for multiplying a first number that has an absolute value that can exceed one by a second number that has an absolute value not exceeding one; said processor comprising:
   means for providing said first and second numbers;
   a multiplier;
   control means connected to said providing means and responsive to an absolute value of said first number equal to or exceeding one for dividing said first number into an integer and a part having a value less than one;
   accumulating means for accumulating said second number as an addend a number of times equal to said integer to produce a sum;
   storage means for supplying said second number and said part to said multiplier to produce a partial product; and
   adder means for adding said partial product to said sum, thereby obtaining a final product of said first and second numbers.

2. An arithmetic processor according to claim 1; wherein said second number represents data and said first number represents a coefficient of said second number.

3. An arithmetic processor according to claim 1; wherein said accumulating means comprises a storage register responsive to the output of said adder means.

4. An arithmetic processor according to claim 1; wherein said storage means comprises an input register and a work memory; and
   further comprising a selector connected to receive outputs from said input register and said adder means and selectively pass said second number from said input register or an output of said adder means to said work memory.

5. An arithmetic processor according to claim 4; further comprising a register to receive an output from said work memory and to supply an output to said selector, thereby enabling calculation by said multiplier and adder means and recirculation of data through said work memory to proceed simultaneously.

6. An arithmetic processor according to claim 1; wherein said storage means comprises a coefficient memory and a register, said coefficient memory being connected to supply an output to a first input of said multiplier and to said register and said register being connected to supply an output to a second input of said multiplier, whereby the same coefficient can be supplied to two inputs of said multiplier for calculating the square thereof.

7. An arithmetic processor according to claim 1; wherein said storage means comprises an input register and said arithmetic processor further comprises an additional register connected to receive data from said input register; said storage means being connected to supply an output to a first input of said multiplier and said additional register being connected to supply an output to a second input of said multiplier, whereby the same data from said input register is supplied to two inputs of said multiplier for calculating the square thereof.

8. An arithmetic processor according to claim 1; wherein said multiplier, control means, accumulating means, storage means and adder means form a first circuit of said arithmetic processor; said arithmetic processor further comprising:
   a second multiplier, a second control means, a second accumulating means, a second storage means and a second adder means respectively corresponding in structure and function to said multiplier, control means, accumulating means, storage means and adder means and forming a second circuit of said arithmetic processor connected in parallel with said first circuit;
   said first and second circuits respectively and simultaneously operating on real and imaginary parts of complex numbers.

9. An arithmetic processor comprising:
   a multiplier capable of multiplying two numeric values each having an absolute value not exceeding one;
   first means responsive to a first numeric value equal to or exceeding one for dividing said first numeric value into an integer and a part having a value less than one;
   second means responsive to said first means for supplying a second numeric value not exceeding one and said part to said multiplier to form a partial product; and
   third means responsive to said first means and said second means for taking said second numeric value as an addend a number of times equal to said integer to form a sum and adding said sum to said partial product, thereby obtaining a final product of said first numeric value and said second numeric value.

10. An arithmetic processor comprising:
    an input register;
    an arithmetic circuit for performing arithmetic operations;
    a work memory having a write input and an output;
    a first selector connected to said input register, said arithmetic circuit and said write input, said first selector being adapted to supply data from said input register to said write input without supplying data from said arithmetic circuit to said write input and being further adapted to supply data from said arithmetic circuit to said write input without supplying data from said input register to said write input, whereby data from said input register or data from said arithmetic circuit can be transferred directly to said work memory; and
    a second selector connected to said input register, said arithmetic circuit and said output for selectively supplying data from said input register or said output to said arithmetic circuit, whereby data from said input register or data from said work memory can be transferred directly to said arithmetic circuit.

11. An arithmetic processor comprising:
    an input register;
    an arithmetic circuit for performing arithmetic operations;
    a work memory having a write input and an output;
    a first selector connected to said input register, said arithmetic circuit and said write input, said first selector being adapted to supply data from said input register to said write input without supplying data from said arithmetic circuit to said write input and being further adapted to supply data from said arithmetic circuit to said write input without supplying data from said input register to said write input, whereby data from said input register or data from said arithmetic circuit can be transferred directly to said work memory;
    a second selector connected to said input register, said arithmetic circuit and said output for selectively supplying data from said input register or said output to said arithmetic circuit, whereby data from said input register or data from said work memory can be transferred directly to said arithmetic circuit; and
    a storage register connected between said output and said selector, whereby data from said output can be recycled to said work memory.

* * * * *